(12) United States Patent
Tsubota et al.

(10) Patent No.: US 8,928,778 B2
(45) Date of Patent: Jan. 6, 2015

(54) CAMERA DEVICE, IMAGE PROCESSING SYSTEM, IMAGE PROCESSING METHOD AND IMAGE PROCESSING PROGRAM

(75) Inventors: Kazuhiro Tsubota, Fukuoka (JP); Junya Kuwada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 13/883,129

(22) PCT Filed: Dec. 20, 2011

(86) PCT No.: PCT/JP2011/007121
§ 371 (c)(1),
(2), (4) Date: May 2, 2013

(87) PCT Pub. No.: WO2012/086188
PCT Pub. Date: Jun. 28, 2012

(65) Prior Publication Data
US 2013/0222646 A1    Aug. 29, 2013

(30) Foreign Application Priority Data
Dec. 24, 2010    (JP) .................................. 2010-287420

(51) Int. Cl.
| H04N 5/262 | (2006.01) |
| H04N 7/18 | (2006.01) |
| G06K 9/00 | (2006.01) |
| H04N 5/217 | (2011.01) |
| G06T 3/60 | (2006.01) |
| H04N 5/232 | (2006.01) |

(52) U.S. Cl.
CPC ............ *H04N 5/2621* (2013.01); *H04N 5/217* (2013.01); *H04N 5/2628* (2013.01); *G06T 3/60* (2013.01); *H04N 5/23293* (2013.01)
USPC ........................... 348/239; 348/143; 382/109

(58) Field of Classification Search
USPC .................................... 348/143, 239; 382/109
See application file for complete search history.

(56) References Cited

U.S. PATENT DOCUMENTS

2006/0232699 A1    10/2006    Suto et al.

FOREIGN PATENT DOCUMENTS

| JP | 2006-020141 | 1/2006 |
| JP | 2006-301034 | 11/2006 |
| JP | 2008-033607 | 2/2008 |
| JP | 2008-048443 | 2/2008 |
| JP | 2010-224691 | 10/2010 |
| JP | 2011-061511 | 3/2011 |

OTHER PUBLICATIONS

Notification of Transmittal of Translation of International Preliminary Report on Patentability, dated Jul. 11, 2013.

*Primary Examiner* — Joel Fosselman
(74) *Attorney, Agent, or Firm* — Greenblum & Bernstein, P.L.C.

(57) ABSTRACT

A camera device includes an imaging unit generating an imaging area image in which an imaging area is captured from above, and a display-image generation unit generating a display image of an imaging object moving in the imaging area by use of an clipped image clipped from the imaging area image. In this case, an clipping reference position P corresponding to the imaging object in the imaging area image is determined, and a reference distance r between an imaging reference position O corresponding to the imaging unit and the clipping reference position P in the imaging area image is calculated. When the reference distance r is short, a rotation angle $\theta_{NEW}$ for rotating the clipped image in generating the display image is calculated based on a reference angle $\theta$ corresponding to an inclination of the imaging object in the imaging area image and the reference distance r.

10 Claims, 10 Drawing Sheets

(a)

$$\theta_{NEW} = \theta_C \times \frac{a-r}{a} + \theta \times \frac{r}{a}$$

(b)

$$\theta_{NEW} = \theta_C \times \frac{a^2 - r^2}{a^2} + \theta \times \frac{r^2}{a^2}$$

(c)

$$\theta_{NEW} = \theta_C \times \frac{a-r}{a-b} + \theta \times \frac{r-b}{a-b} \quad (b \leq r \leq a)$$
$$\theta_{NEW} = 0 \quad (r \leq b)$$

CAMERA DEVICE, IMAGE PROCESSING SYSTEM, IMAGE PROCESSING METHOD AND IMAGE PROCESSING PROGRAM

TECHNICAL FIELD

The present invention relates to a camera device having a function of generating a display image of an imaging object moving in an imaging area by use of an clipped image clipped from an image (imaging area image) in which the imaging area is captured from above.

BACKGROUND ART

Conventionally, a system that generates a display image by processing an omni-directional image (fish-eye image) captured by a camera having a fish-eye lens has been proposed (for example, refer to Patent Literature 1 to Patent Literature 3). As one of such image processing systems, a system is known in which a display image of an imaging object moving in an imaging area is generated by using an clipped image clipped from an image (imaging area image) in which the imaging area is captured from above.

In the conventional system like this, since the imaging area image is captured by the camera having the fish-eye lens, the imaging object inclines according to the position of the imaging object in the imaging area image. Thus, processing for rotating the clipped image according to the inclination is performed when the display image is generated from the clipped image clipped from the imaging area image.

However, in the conventional system, when the imaging object passes nearly just under the camera, the orientation of the imaging object displayed in the display image suddenly changes due to the influence of the processing for rotating the clipped image, resulting in that the display image is hard to see.

CITATION LIST

Patent Literature

Patent Literature 1: Japanese Patent Laid-Open No. 2006-20141
Patent Literature 2: Japanese Patent Laid-Open No. 2008-33607
Patent Literature 3: Japanese Patent Laid-Open No. 2006-301034

SUMMARY OF INVENTION

Technical Problem

The present invention has been accomplished under the above circumstances. The objective of the present invention is to provide a camera device capable of preventing a sudden change in orientation of an imaging object displayed in a display image when the imaging object passes nearly just under the camera device.

Solution to Problem

One aspect of the present invention is a camera device, and the camera device includes: an imaging unit that is installed above an imaging area and generates an imaging area image in which the imaging area is captured from above; and a display-image generation unit that generates a display image of an imaging object moving in the imaging area by use of an clipped image clipped from the imaging area image, wherein the display-image generation unit includes: a reference-position determination unit determining as an clipping reference position, a position in the imaging area image, corresponding to the imaging object and serving as a reference when the clipped image is clipped from the imaging area image; a distance calculation unit calculating as a reference distance, a distance between an imaging reference position which is a position corresponding to the imaging unit, and the clipping reference position in the imaging area image; a rotation-angle calculation unit calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and an image clipping unit generating the display image by clipping an image as the clipped image on the basis of the clipping reference position and the rotation angle.

Another aspect of the present invention is an image processing system, and the image processing system includes: a camera device that is installed above an imaging area and generates an imaging area image in which the imaging area is captured from above; and an image processing device that generates a display image of an imaging object moving in the imaging area by use of an clipped image clipped from the imaging area image, wherein the image processing device includes a reference-position determination unit determining as an clipping reference position, a position in the imaging area image, corresponding to the imaging object and serving as a reference when the clipped image is clipped from the imaging area image; a distance calculation unit calculating as a reference distance, a distance between an imaging reference position which is a position corresponding to the camera device, and the clipping reference position in the imaging area image; a rotation-angle calculation unit calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and an image clipping unit generating the display image by clipping an image as the clipped image on the basis of the clipping reference position and the rotation angle.

Another aspect of the present invention is an image processing method, and the image processing method generates an imaging area image in which an imaging area is captured from above by use of a camera device installed above the imaging area and generates a display image of an imaging object moving in the imaging area by use of an clipped image clipped from the imaging area image, wherein the image processing method includes the steps of: determining as an clipping reference position, an position in the imaging area image, corresponding to the imaging object and serving as a reference when the clipped image is clipped from the imaging area image; calculating as a reference distance, a distance between an imaging reference position which is a position corresponding to the camera device, and the clipping reference position in the imaging area image; calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and generating the display image by clipping an image as the clipped image on the basis of the clipping reference position and the rotation angle.

Another aspect of the present invention is an image processing program, and the image processing program generates an imaging area image in which the imaging area is captured from above by use of a camera device installed above the imaging area and generates a display image of an imaging object moving in the imaging area by use of the clipped image clipped from the imaging area image, wherein the image processing program causes a computer to execute the processing of: determining as an clipping reference position, a position in the imaging area image, corresponding to the imaging object and serving as a reference when the clipped image is clipped from the imaging area image; calculating as a reference distance, a distance between an imaging reference position which is a position corresponding to the camera device, and the clipping reference position in the imaging area image; calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and generating the display image by clipping an image as the clipped image on the basis of the clipping reference position and the rotation angle.

As described below, the present invention has other aspects. Accordingly, this disclosure of the invention is intended to provide a part of the aspects of the present invention, and is not intended to limit the scope of the invention which is described and claimed herein.

DESCRIPTION OF EMBODIMENTS

Figure 1:
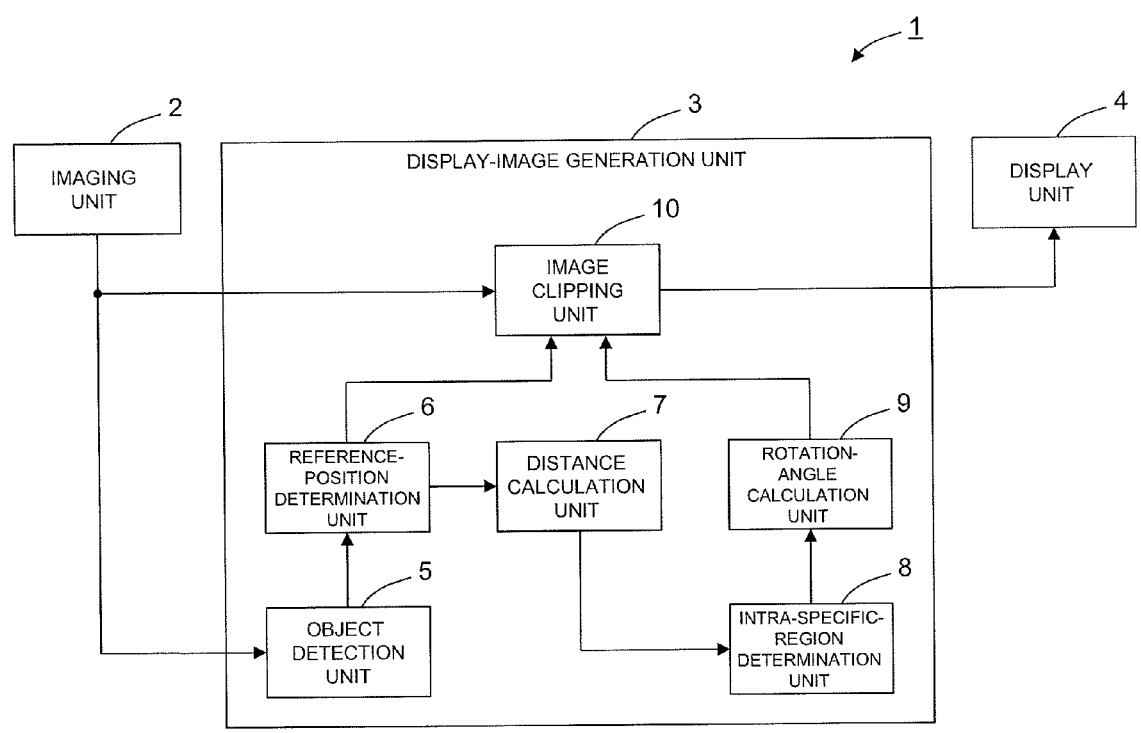
FIG. 1 is a block diagram of a camera device in accordance with a first embodiment of the present invention.

Detailed description of the present invention will be described below. However, the detailed description below and the attached drawings are not intended to limit the present invention.

A camera device of the present invention includes: an imaging unit that is installed above an imaging area and generates an imaging area image in which the imaging area is captured from above; and a display-image generation unit that generates a display image of an imaging object moving in the imaging area by use of an clipped image clipped from the imaging area image, wherein the display-image generation unit includes: a reference-position determination unit determining as an clipping reference position, a position in the imaging area image, corresponding to the imaging object and serving as a reference when the clipped image is clipped from the imaging area image; a distance calculation unit calculating as a reference distance, a distance between an imaging reference position which is a position corresponding to the imaging unit, and the clipping reference position in the imaging area image; a rotation-angle calculation unit calculating a rotation angle for rotating the clipped image in generating the display image on the basis of a reference angle which is an angle corresponding to an inclination of the imaging object in the imaging area image, and the reference distance when the reference distance is shorter than or equal to a threshold distance; and an image clipping unit generating the display image by clipping an image as the clipped image on the basis of the clipping reference position and the rotation angle.

With this configuration, a suitable display image of the imaging object moving in the imaging area can be generated by using the clipped image clipped from the image (imaging area image) in which the imaging area is captured from above. In this case, when a distance (reference distance) between a position (clipping reference position) corresponding to the imaging object and a position (imaging reference position) corresponding to the imaging unit is short, namely, when the imaging object passes nearly just under the imaging unit (camera device), a rotation angle for rotating the clipped image in generating the display image is suitably calculated based on an inclination angle (reference angle) of the imaging object in the imaging area image and the reference distance. This configuration can prevent a sudden change in orientation of the imaging object displayed in the display image occurring when the imaging object passes nearly just under the imaging unit (camera device).

In the camera device of the present invention, the rotation-angle calculation unit calculates the rotation angle by performing weighting processing according to the reference distance with respect to the target angel for rotating the clipped image when the clipping reference position becomes closest to the imaging reference position and the reference angle, and the weighting processing is processing in which the shorter the reference distance is, the smaller the weighting of the reference angle is and the larger the weighting of the target angle is.

With this configuration, the rotation angle is suitably calculated, by performing weighting processing according to the reference distance, with respect to the angel (target angle) for rotating the clipped image when the imaging object (clipping reference position) becomes closest to the imaging unit (imaging reference position) and the reference angle. More specifically, the weighting processing is performed in which the shorter the reference distance is, the smaller the weighting of the reference angle is and the larger the weighting of the target angle is. This configuration can prevent a sudden change in orientation of the imaging object displayed in the display image occurring when the imaging object passes nearly just under the imaging unit (camera device).

In the camera device of the present invention, the weighing processing is processing that sets the rotation angle to the target angle when the reference distance is shorter than or equal to a second threshold distance shorter than the threshold distance.

With this configuration, when the distance (reference distance) between the position (clipping reference position) corresponding to the imaging object and the position (imaging reference position) corresponding to the imaging unit is still shorter, namely, when the imaging object passes further nearly just under the imaging unit (camera device), the weighting processing in which the rotation angle is set to the target angle (the weighting of the reference angle is set to be 0% and the weighting of the target angle is set to be 100%) is performed. This configuration can prevent a sudden change in orientation of the imaging object displayed in the display image occurring when the imaging object passes nearly just under the imaging unit (camera device).

In the camera device of the present invention, the target angle is set to the reference angle defined when the imaging object enters the imaging area or to be 0 degree.

With this configuration, the target angle is set to the reference angle defined when the imaging object enters the imaging area or to be 0 degree. For this reason, the target angle is suitably set.

The camera device of the present invention includes an object detection unit that detects the imaging object included in the imaging area image by performing image processing to the imaging area image.

With this configuration, the imaging object included in the imaging area image can be detected by performing the image processing to the imaging area image. Thus, another dedicated device does not need to be provided to detect the imaging object.

In the camera device of the present invention, the display-image generation unit includes a virtual-reference-position determination unit determining, based on the clipping reference position, a virtual clipping reference position having a distance from the imaging reference position of not shorter than the threshold distance when the reference distance is shorter than or equal to the threshold distance, the rotation angle calculation unit calculates the rotation angle on the basis of the reference angle and the reference distance defined when the clipping reference position is assumed to be the virtual clipping reference position when the reference distance is shorter than or equal to the threshold distance, and the image clipping unit generates the display image by clipping an image as the clipped image on the basis of the clipping reference position and the rotation angle defined when the clipping reference position is assumed to be the virtual clipping reference position.

With this configuration, when the distance (reference distance) between the position (clipping reference position) corresponding to the imaging object and the position (imaging reference position) corresponding to the imaging unit is short, namely, when the imaging object passes nearly just under the imaging unit (camera device), a virtual clipping reference position having a distance from the imaging reference position of not shorter than the threshold distance is determined, and the rotation angle is suitably calculated based on the reference angle and the reference distance defined when the clipping reference position is assumed to be the virtual clipping reference position. Then, the display image is generated by clipping an image as the clipped image on the basis of the clipping reference position and the rotation angle defined when the clipping reference position is assumed to be the virtual clipping reference position. This configuration can prevent a sudden change in orientation of the imaging object displayed in the display image occurring when the imaging object passes nearly just under the imaging unit (camera device).

In the camera device of the present invention, the imaging unit has a lens with a wider angle of view than a normal lens.

With this configuration, a suitable display image of the imaging object moving in the imaging area can be generated by using the clipped image clipped from the imaging area image (a fish-eye image or a wide-angle image) captured by a lens with a wider angle of view than a normal lens (such as a fish-eye lens, a quasi wide-angle lens, and a super wide-angle lens).

An image processing system of the present invention includes: a camera device that is installed above an imaging area and generates an imaging area image in which the imaging area is captured from above; and an image processing device that generates a display image of an imaging object moving in the imaging area by use of an clipped image clipped from the imaging area image, wherein the image processing device includes: a reference-position determination unit determining as an clipping reference position, a position in the imaging area image, corresponding to the imaging object and serving as a reference when the clipped image is clipped from the imaging area image; a distance calculation unit calculating as a reference distance, a distance between an imaging reference position which is a position corresponding to the camera device, and the clipping reference position in the imaging area image; a rotation-angle calculation unit calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and an image clipping unit generating the display image by clipping an image as the clipped image on the basis of the clipping reference position and the rotation angle.

Also with this image processing system, as in the camera device above, a suitable display image of the imaging object moving in the imaging area can be generated by use of the clipped image clipped from the image (imaging area image) in which the imaging area is captured from above. In this case, when the distance (reference distance) between the position (clipping reference position) corresponding to the imaging object and the position (imaging reference position) corresponding to the imaging unit is short, namely, when the imaging object passes nearly just under the imaging unit (camera device), a rotation angle for rotating the clipped image in generating the display image is suitably calculated based on an inclination angle (reference angle) of the imaging object in the imaging area image and the reference distance. This configuration can prevent a sudden change in orientation of the imaging object displayed in the display image occurring when the imaging object passes nearly just under the imaging unit (camera device).

An image processing method of the present invention generates an imaging area image in which an imaging area is captured from above by use of a camera device installed above the imaging area and generates a display image of an imaging object moving in the imaging area by use of an clipped image clipped from the imaging area image, wherein the image processing method includes the steps of: determining as an clipping reference position, a position in the imaging area image, corresponding to the imaging object and serving as a reference when the clipped image is clipped from the imaging area image; calculating as a reference distance, a distance between an imaging reference position which is a position corresponding to the camera device, and the clipping reference position in the imaging area image; calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and generating the display image by clipping an image as the clipped image on the basis of the clipping reference position and the rotation angle.

Also with this image processing method, as in the camera device above, a suitable display image of the imaging object moving in the imaging area can be generated by use of the clipped image clipped from the image (imaging area image) in which the imaging area is captured from above. In this case, when the distance (reference distance) between the position (clipping reference position) corresponding to the imaging object and the position (imaging reference position) corresponding to the imaging unit is short, namely, when the imaging object passes nearly just under the imaging unit (camera device), a rotation angle for rotating the clipped image in generating the display image is suitably calculated based on an inclination angle (reference angle) of the imaging object in the imaging area image and the reference distance. This configuration can prevent a sudden change in orientation of the imaging object displayed in the display image occurring when the imaging object passes nearly just under the imaging unit (camera device).

An image processing program of the present invention generates an imaging area image in which an imaging area is captured from above by use of a camera device installed above the imaging area and generates a display image of an imaging object moving in the imaging area by use of an clipped image clipped from the imaging area image, wherein the image processing program causes a computer to execute the processing of: determining as an clipping reference position, a position in the imaging area image, corresponding to the imaging object and serving as a reference when the clipped image is clipped from the imaging area image; calculating as a reference distance, a distance between an imaging reference position which is a position corresponding to the camera device, and the clipping reference position in the imaging area image; calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and generating the display image by clipping an image as the clipped image on the basis of the clipping reference position and the rotation angle.

Also with this image processing program, as in the camera device above, a suitable display image of the imaging object moving in the imaging area can be generated by using the clipped image clipped from the image (imaging area image) in which the imaging area is captured from above. In this case, when the distance (reference distance) between the position (clipping reference position) corresponding to the imaging object and the position (imaging reference position) corresponding to the imaging unit is short, namely, when the imaging object passes nearly just under the imaging unit (camera device), a rotation angle for rotating the clipped image in generating the display image is suitably calculated based on an inclination angle (reference angle) of the imaging object in the imaging area image and the reference distance. This configuration can prevent a sudden change in orientation of the imaging object displayed in the display image occurring when the imaging object passes nearly just under the imaging unit (camera device).

According to the present invention, it is possible to prevent a sudden change in orientation of an imaging object displayed in a display image occurring when the imaging object passes nearly just under a camera device.

Hereinafter, a camera device in accordance with embodiments of the present invention is described by using the drawings. The embodiments describe a case of an image processing device used in, for example, a system monitoring a predetermined imaging area (such as a store and a station yard). The image processing device has a function of generating a display image of an imaging object moving in the imaging area by use of an clipped image clipped from an image (imaging area image) in which the imaging area is captured from above. This function is achieved by a program stored in, for example, a memory of the image processing device.

First Embodiment

A configuration of a camera device in accordance with a first embodiment of the present invention will be described with reference to drawings. FIG. 1 is a block diagram of the camera device in accordance with the first embodiment of the present invention. As shown in FIG. 1, a camera device 1 includes an imaging unit 2 capturing an image (imaging area image) in an imaging area, a display-image generation unit 3 providing predetermined image processing (described later) to the imaging by the imaging unit 2 to generate a display image, and a display unit 4 displaying the display image.

The imaging unit 2 has an imaging element (not shown) such as a CCD or a CMOS and a lens (not shown) disposed on the light axis of the imaging. The lens of the imaging unit 2 is a lens having a wider angle of view than a normal lens (for example, a fish-eye lens, a quasi wide-angle lens, a wide-angle lens, and a super wide-angle lens). The imaging unit 2 is installed on, for example, a ceiling of the imaging area, and the orientation of the light axis is in the vertical direction. Thus, the imaging unit 2 generates an image in which the imaging area is captured from above (an image with an angle of view so as to look down from the ceiling).

The display-image generation unit 3 has a function of generating a display image of an imaging object (such as a person) moving in the imaging area by use of an clipped image clipped from the imaging area image (refer to FIG. 2), and includes an object detection unit 5, a reference-position determination unit 6, a distance calculation unit 7, an intra-specific-region determination unit 8, a rotation-angle calculation unit 9, and an image clipping unit 10, as a configuration for achieving the function.

The object detection unit 5 has a function of detecting the imaging object (such as a person) included in the imaging area image by providing image processing to the imaging area image. For example, the object detection unit 5 detects the imaging object (person) from the imaging area image by providing motion difference processing or background difference processing to the imaging area image.

The reference-position determination unit 6 determines a position (clipping reference position) serving as a reference when the clipped image is clipped, on the basis of the detection result of the object detection unit 5. For example, the reference-position determination unit 6 determines the position of the barycenter of an image region of the detected imaging object as the clipping reference position. The reference-position determination unit 6 may determine the position of the center of a frame surrounding the detected imaging object (for example, a rectangular frame circumscribing the imaging object) as the clipping reference position. The clipping reference position is also thought as the position corresponding to the imaging object in the imaging area image.

The distance calculation unit 7 calculates a distance (reference distance) between a position (imaging reference position) corresponding to the imaging unit 2 and the clipping reference position determined by the reference-position determination unit 6, in the imaging area image. When specifically described by using the example in FIG. 2, if the imaging unit 2 is the camera device 1 having a fish-eye lens, the imaging reference position O is the center of the imaging area image (fish-eye image). Thus, the distance calculation unit 7 calculates a distance r between the clipping reference position P determined by the reference-position determination unit 6 and the imaging reference position O as the reference distance. The reference position r may be calculated by the number of pixels in the imaging area image or may be calculated by a value converted to an actual distance (such as meters).

The intra-specific-region determination unit 8 determines whether or not the imaging object included in the imaging area image exists in a predetermined specific area (for example, a circle area with the center of the imaging reference position O and with a radius a) (refer to FIG. 3). More specifically, the intra-specific-region determination unit 8 determines whether or not the reference distance r calculated by the distance calculation unit 7 is shorter than or equal to the radius a. The radius a can be set by a user as needed. The radius a is set to be, for example, 10 m. The specific region can be set over the entire imaging area. In that case, the radius a is set to be infinity.

Figure 2:
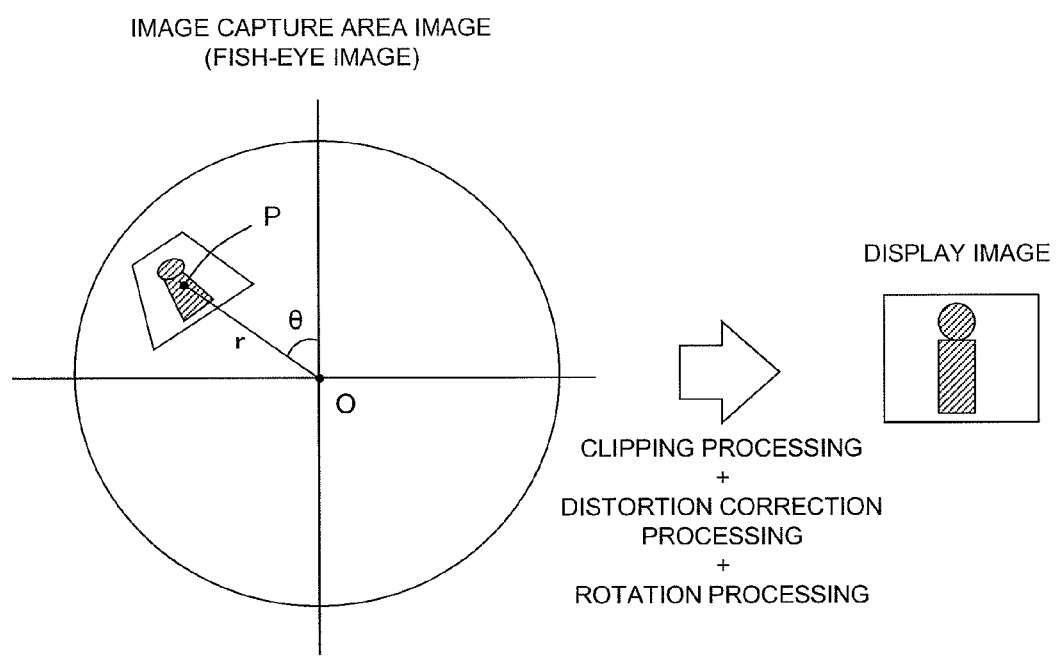
FIG. 2 is an explanatory drawing of processing in which a display image is generated by clipping an image as an clipped image from an imaging area image.

The rotation-angle calculation unit 9 calculates a rotation angle for rotating the clipped image in generating the display image from the imaging area image (refer to FIG. 2). In this case, as described below, a rotation angle θ defined when the imaging object is outside the specific region and a rotation angle $θ_{NEW}$ defined when the imaging object is within the specific region are calculated by using different methods.

When the imaging object is outside the specific region, the rotation-angle calculation unit 9 determines the rotation angle θ depending on where the clipping reference position is located in the imaging area image, as is conventionally done. For example, as shown in FIG. 2, if the imaging unit 2 is the camera device 1 having a fish-eye lens, the rotation-angle calculation unit 9 determines the angle θ of the clipping reference position P with respect to the imaging reference position O as the rotation angle. The angle θ is also an angle corresponding to an inclination of the imaging object in the imaging area image. Thus, when the clipped image is rotated by only the angle θ, the display image with no inclination is obtained (refer to FIG. 2).

When the imaging object is within the specific region, the rotation-angle calculation unit 9 calculates the rotation angle $θ_{NEW}$ on the basis of the above angle θ (reference angle θ) and the reference distance r. In this case, the rotation-angle calculation unit 9 calculates the rotation angle $θ_{NEW}$ by performing weighting processing according to the reference distance r with respect to an angle (target angle $θ_C$) for rotating the clipped image when the clipping reference position P becomes closest to the imaging reference position O and the angle θ. More specifically, the rotation-angle calculation unit 9 performs the weighting processing in which the shorter the reference distance r is, the smaller the weighting of the reference angle θ is and the larger the weighting of the target angle $θ_C$ is (refer to FIG. 5(a) to FIG. 5(c)). This weighting processing can also be calculated by using an interpolation of two vectors, for example, a vector (cos θ, sin θ) and a vector (cos $θ_C$, sin $θ_C$) in a vector space.

Figure 5:
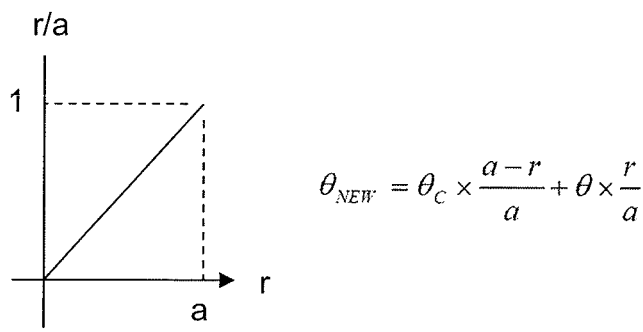
FIGS. 5(a), 5(b) and 5(c) are explanatory drawings showing the calculation method (weighting process) of rotation angle in accordance with the first embodiment.
Figure 5:
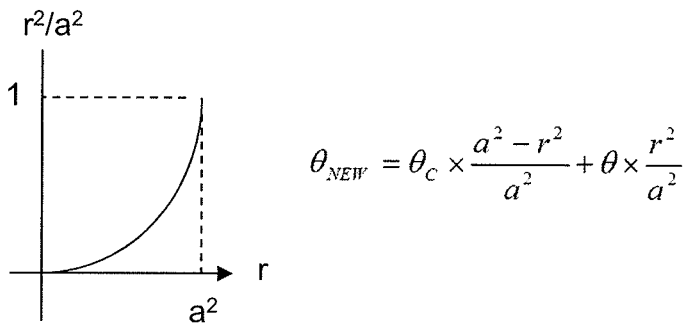
Figure 5:
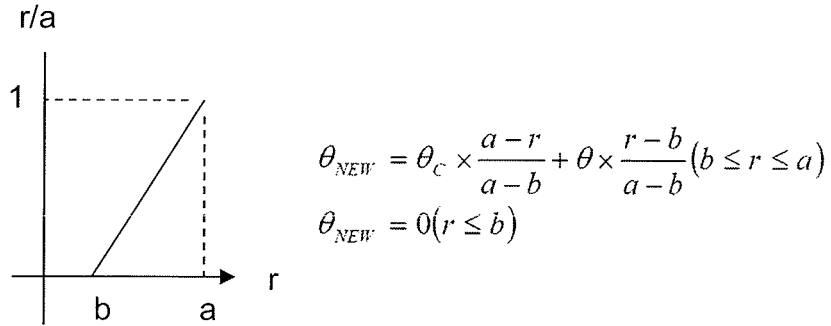

As in the example in FIG. 5(c), the weighting processing may be processing in which the rotation angle ° NEW is set to the target angle $θ_C$ (the weighting of the target angle $θ_C$ is set to be 100% and the weighting of the reference angle θ is set to be 0%) when the reference distance r is shorter than or equal to a predetermined radius b. The radius b may be a value smaller than the radius a, and the value can be set by a user as needed. Further, in this case, the target angle $θ_C$ may also be an angle $θ_{IN}$ defined when the imaging object enters the imaging area (refer to FIG. 3), or may be 0 degree.

The image clipping unit 10 clips an image as the clipped image from the imaging area image on the basis of the clipping reference position determined by the reference-position determination unit 6. Additionally, the image clipping unit 10 corrects distortion due to the optical characteristics of a lens (such as a fish-eye lens) of the imaging unit 2. Moreover, the image clipping unit 10 rotates the clipped image on the basis of the rotation angle (the rotation angle θ when the imaging object is outside the specific region or the rotation angle $θ_{NEW}$ when the imaging object is within the specific area) calculated by the rotation-angle calculation unit 9. As discussed above, the image clipping unit 10 generates the display image from the imaging area image (refer to FIG. 2).

Hereinafter, the operation of the camera device 1 as configured above will be described with reference to the drawings.

Figure 3A:
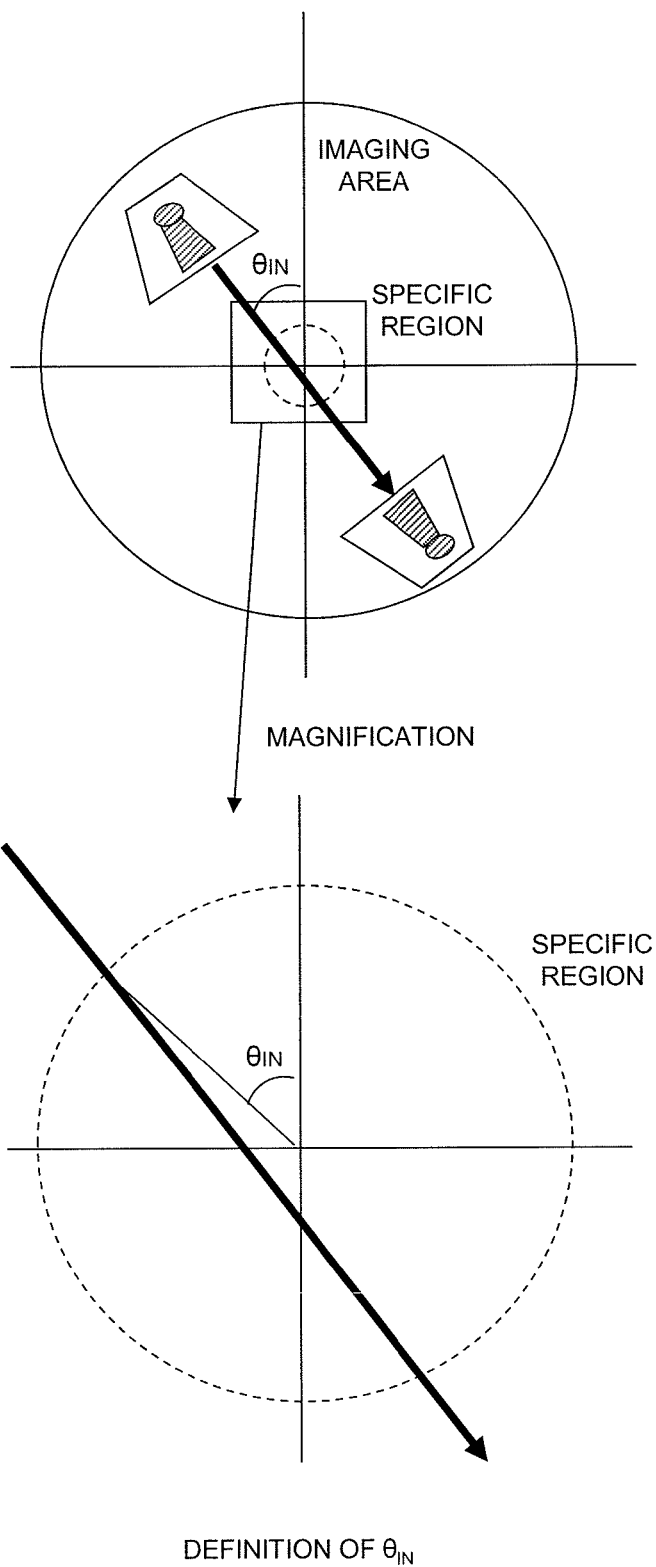
FIG. 3(a) is an explanatory drawing showing the movement of an imaging object and a specific region in the imaging area.
Figure 3B:
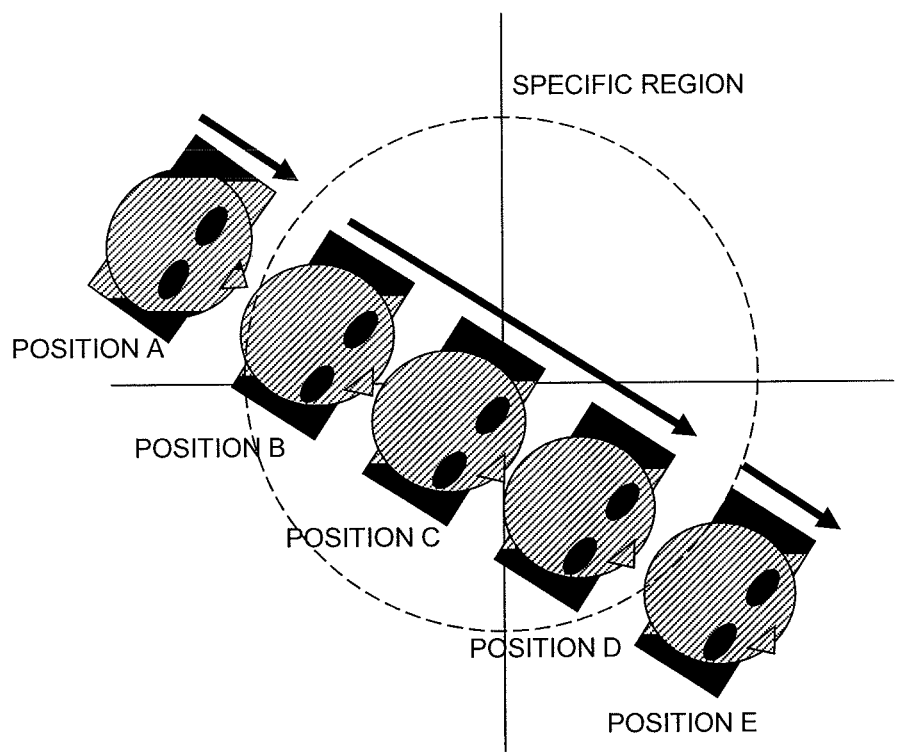
FIG. 3(b) is an explanatory drawing showing the movement of the imaging object and the specific region in the imaging area.

Here, as shown in FIG. 3(a), a description will be given of the processing performed when the imaging object (such as a person) in the imaging area passes the specific region (nearly just under the camera device 1). FIG. 3(b) is a magnified view near the specific region. In this example, the imaging object moves from the position A to the position E, the position A is outside the specific region, the positions B to D are within the specific region, and the position E is outside the specific region.

Figure 4:
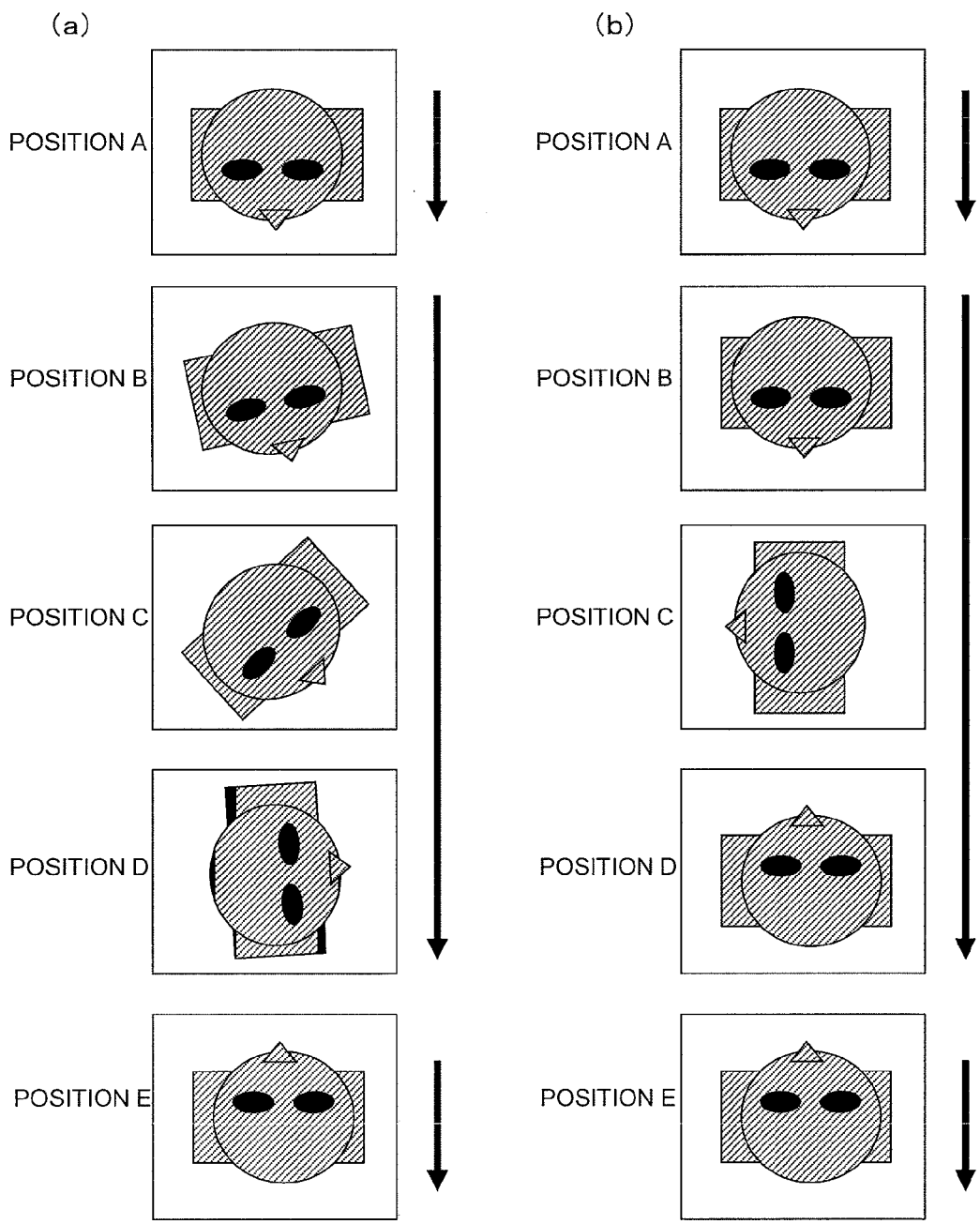
FIGS. 4(a) and 4(b) are explanatory drawings showing the transition of the display image occurring when the imaging object moves in the specific region.

FIG. 4 is a drawing showing the transition of the display image occurring when the imaging object moves from the position A to the position E, as described above. FIG. 4(a) shows the transition of the display image generated by the camera device 1 of the embodiment, whereas FIG. 4(b) shows the transition of the display image generated by a conventional device, as a comparison example. As shown in FIG. 4, in the embodiment, it is possible to prevent a sudden change in orientation of the imaging object occurring when the imaging object passes nearly just under the camera device 1 (when the imaging object is located from the position B to the position D), as compared with the conventional device.

According to the camera device 1 of the first embodiment as described above, a suitable display image of the imaging object moving in the imaging area can be generated by using the clipped image clipped from the image (imaging area image) in which the imaging area is captured from above. In this case, when the distance (reference distance r) between the position (clipping reference position P) corresponding to the imaging object and the position (imaging reference position O) corresponding to the imaging unit 2 is short, namely, when the imaging object passes nearly just under the imaging unit 2 (camera device 1), the rotation angle $θ_{NEW}$ for rotating the clipped image in generating the display image is suitably calculated based on an inclination angle (reference angle θ) of the imaging object in the imaging area image and the reference distance r. For this reason, although variation in the rotation angle suddenly becomes larger near the center, the rotation angle can be gently changed by weighting according to a distance from the center, thereby preventing a sudden change in orientation of the imaging object displayed in the display image occurring when the imaging object passes nearly just under the imaging unit 2 (camera device 1) (refer to FIG. 4).

In this embodiment, the rotation angle $\theta_{NEW}$ is suitably calculated by performing weighting processing according to the reference distance r with respect to the angel (target angle $\theta_C$) for rotating the clipped image when the imaging object (clipping reference position P) becomes closest to the imaging unit 2 (imaging reference position O) and the reference angle $\theta$. More specifically, the weighting processing is performed in which the shorter the reference distance r is, the smaller the weighting of the reference angle $\theta$ is and the larger the weighting of the target angle $\theta_C$ is. This configuration can prevent a sudden change in orientation of the imaging object displayed in the display image occurring when the imaging object passes nearly just under the imaging unit 2 (camera device 1) (refer to FIG. 4).

Further, in this embodiment, when the distance (reference distance r) between the position (clipping reference position P) corresponding to the imaging object and the position (imaging reference position O) corresponding to the imaging unit 2 is still shorter, namely, when the imaging object passes further nearly just under the imaging unit 2 (camera device 1), the weighting processing in which the rotation angle $\theta_{NEW}$ is set to the target angle $\theta_C$ (the weighting of the reference angle $\theta$ is set to be 0% and the weighting of the target angle $\theta_C$ is set to be 100%) is performed. This configuration can prevent a sudden change in orientation of the imaging object displayed in the display image occurring when the imaging object passes nearly just under the imaging unit 2 (camera device 1).

Further, in this embodiment, the target angle $\theta_C$ is set to a reference angle $\theta_{IN}$ defined when the imaging object enters the imaging area or to be 0 degree. For this reason, the target angle $\theta_C$ is suitably set.

Further, in this embodiment, the imaging object (such as a person) included in the imaging area image can be detected by providing image processing to the imaging area image. Thus, another dedicated device does not need to be provided to detect the imaging object.

Further, in this embodiment, a suitable display image of the imaging object moving in the imaging area can be generated by using the clipped image clipped from the imaging area image (a fish-eye image or a wide-angle image) captured by a lens (such as a fish-eye lens, a quasi wide-angle lens, a wide-angle lens, and a super wide-angle lens) having a wider angle of view than a normal lens.

Second Embodiment

Next, a camera device in accordance with a second embodiment of the present invention will be described. Here, differences of the camera device of the second embodiment from the first embodiment will be mainly described. Unless otherwise noted, the configuration and the operation of the embodiment are the same as those of the first embodiment.

Figure 6:
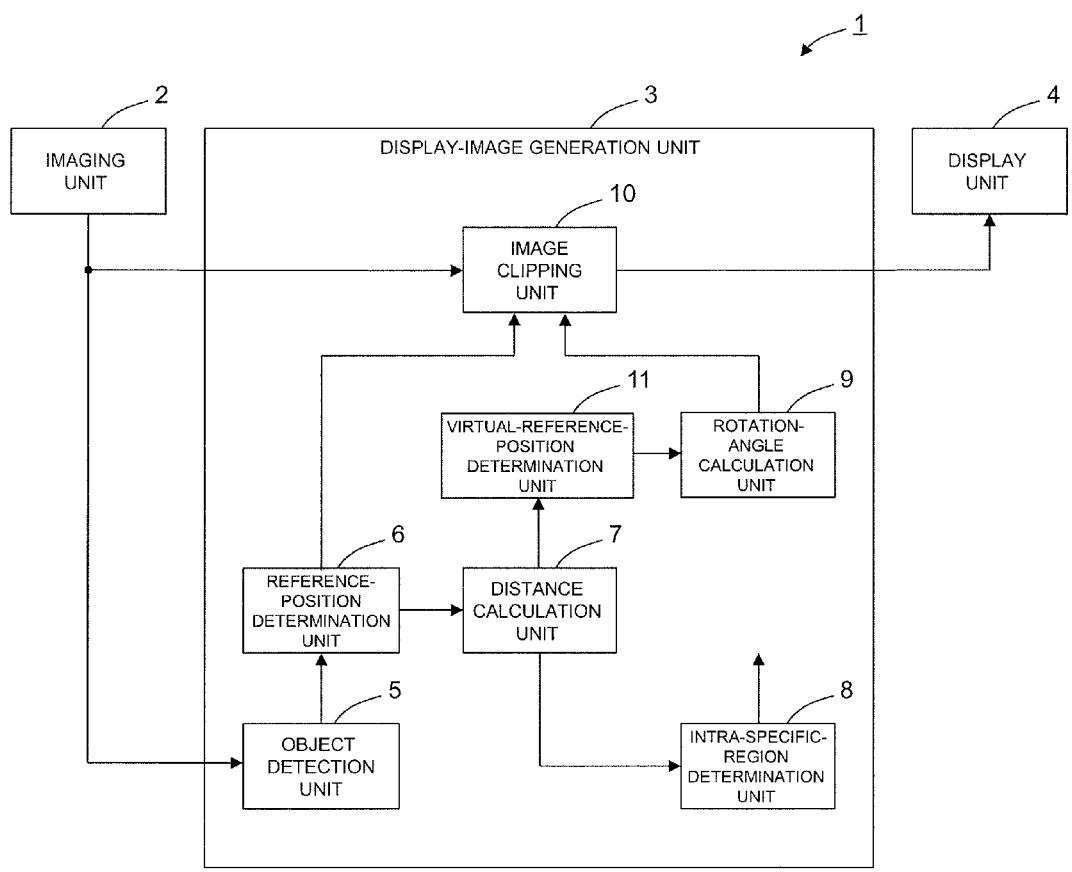
FIG. 6 is a block diagram of a camera device in accordance with a second embodiment of the present invention.

FIG. 6 is a block diagram showing a configuration of a camera device 1 in accordance with the second embodiment. As shown in FIG. 6, a display-image generation unit 3 has a virtual-reference-position determination unit 11. The virtual-reference-position determination unit 11 determines, based on an clipping reference position P, a virtual clipping reference position P' having a distance r from an imaging reference position O of not shorter than a radius c when an imaging object included in an imaging area image is within a predetermined specific region (for example, a circle area with a center of the imaging reference position O and with a radius c). The radius c can be set by a user as needed. The radius c is set to be, for example, 10 m.

Figure 7:
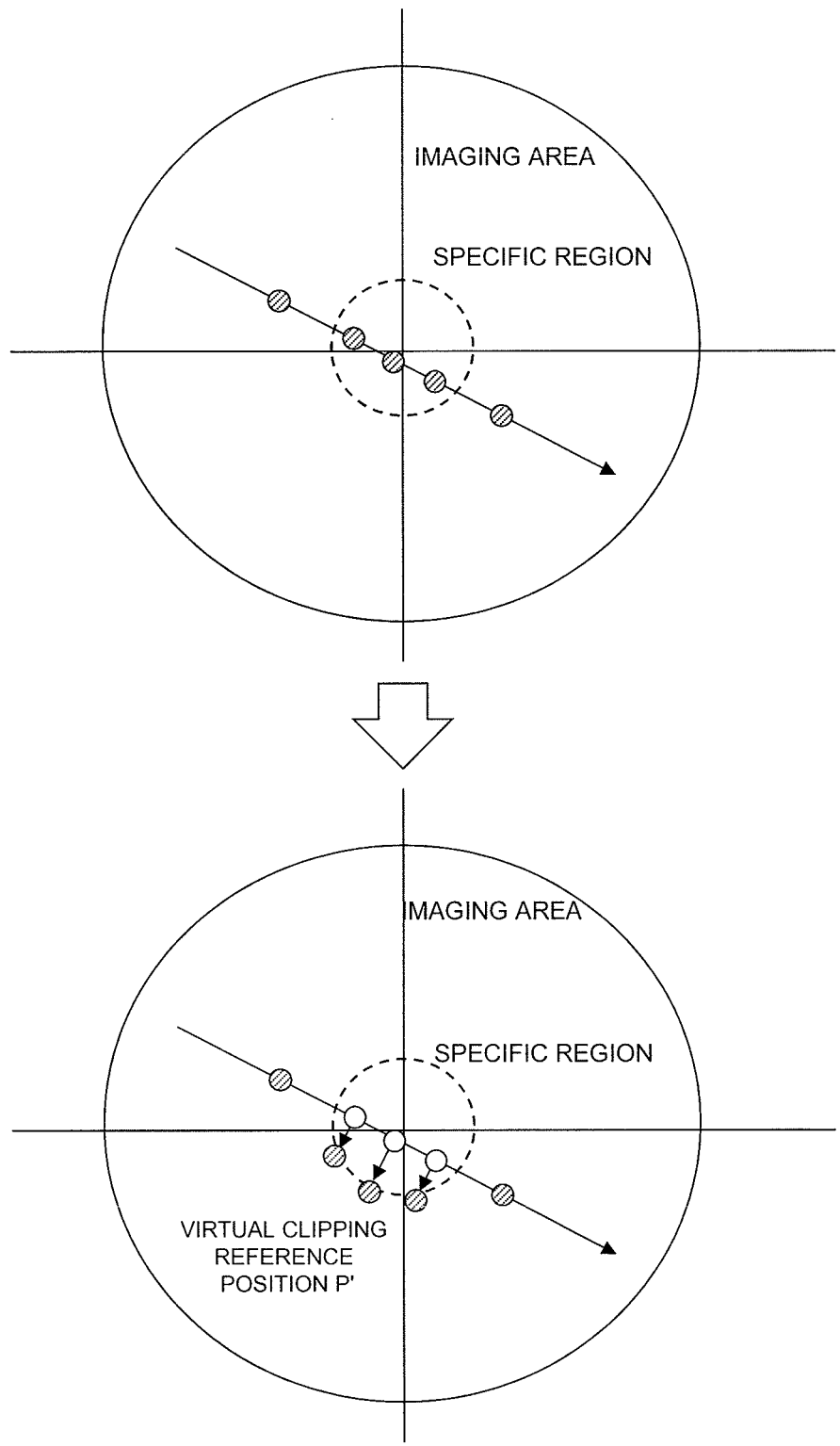
FIG. 7 is an explanatory drawing of a virtual clipping reference position in accordance with the second embodiment.

For example, as shown in FIG. 7, the virtual-reference-position determination unit 11 determines the position obtained by orthographically projecting the clipping reference position P on the circumference of the radius c in the direction perpendicular to the moving direction of the imaging object, as the virtual clipping reference position P' when the imaging object is within the specific region, namely, when where the reference distance r between the clipping reference position P and the imaging reference position O is shorter than or equal to the radius c. An image clipping unit 10 generates a display image by clipping an image as the clipped image from the imaging area image on the basis of the clipping reference position and the rotation angle defined when the clipping reference position P is assumed to be the virtual clipping reference position P'.

Additionally, a rotation-angle calculation unit 9 calculates the rotation angle on the basis of the reference angle and the reference distance defined when the clipping reference position P is assumed to be the virtual clipping reference position P' when the imaging object is within the specific region, namely, when the reference distance r between the clipping reference position P and the imaging reference position O is shorter than or equal to the radius c. Then, the image clipping unit 10 generates the display image from the imaging area image by rotating the clipped image on the basis of the thus calculated rotation angle.

The camera device 1 of the second embodiment described above also produces the same effect as that of the first embodiment.

In this embodiment, when the distance (reference distance r) between the position (clipping reference position P) corresponding to the imaging object and the position (imaging reference position O) corresponding to an imaging unit 2 is short, namely, when the imaging object passes nearly just under the imaging unit 2 (camera device 1), the virtual clipping reference position P' having a distance from the imaging reference position O of not shorter than the radius c is determined, and the rotation angle is suitably calculated based on the reference angle and the reference distance defined when the clipping reference position P is assumed to be the virtual clipping reference position P'. Then, the display image is generated by clipping an image as the clipped image on the basis of the rotation angle defined when the clipping reference position P is assumed to be the virtual clipping reference position P'. For this reason, although variation in the rotation angle becomes larger in the center, the variation in rotation angle can be prevented by using the rotation angle in the virtual clipping reference position, thereby preventing a sudden change in orientation of the imaging object displayed in the display image occurring when the imaging object passes nearly just under the imaging unit 2 (camera device 1).

Although the embodiments of the present invention have been described above as examples, the scope of the present invention is not limited thereto, and the present invention may be altered or modified according to the purpose within the scope as defined in the claims.

Figure 8:
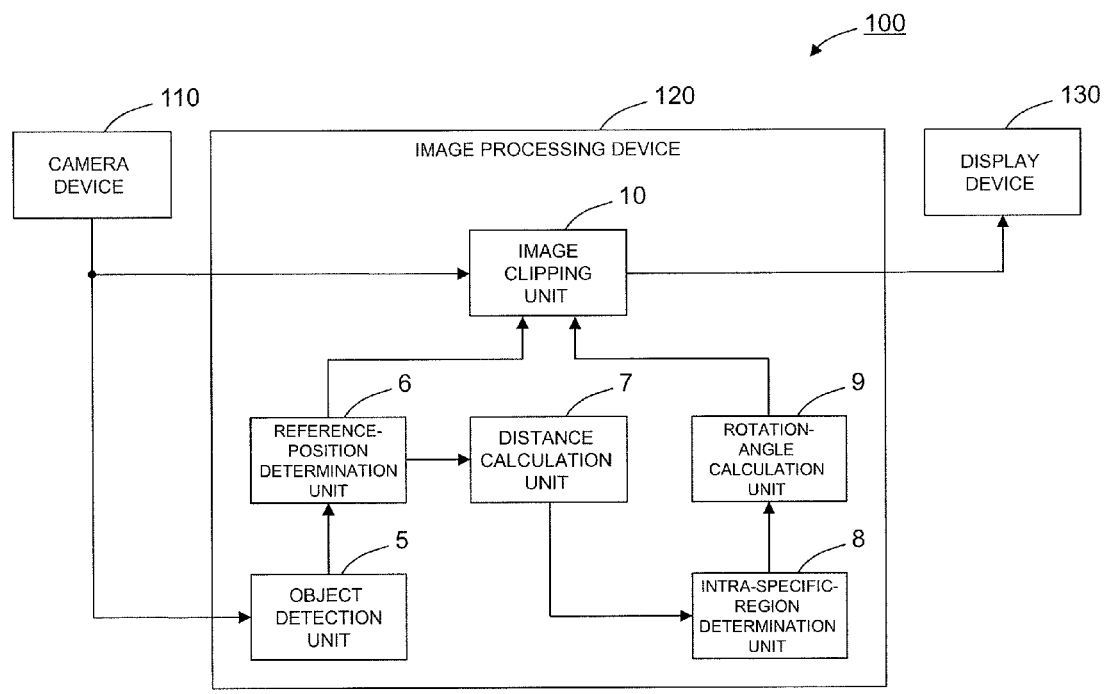
FIG. 8 is a block diagram of an image processing system in accordance with another embodiment of the present invention.
Figure 9:
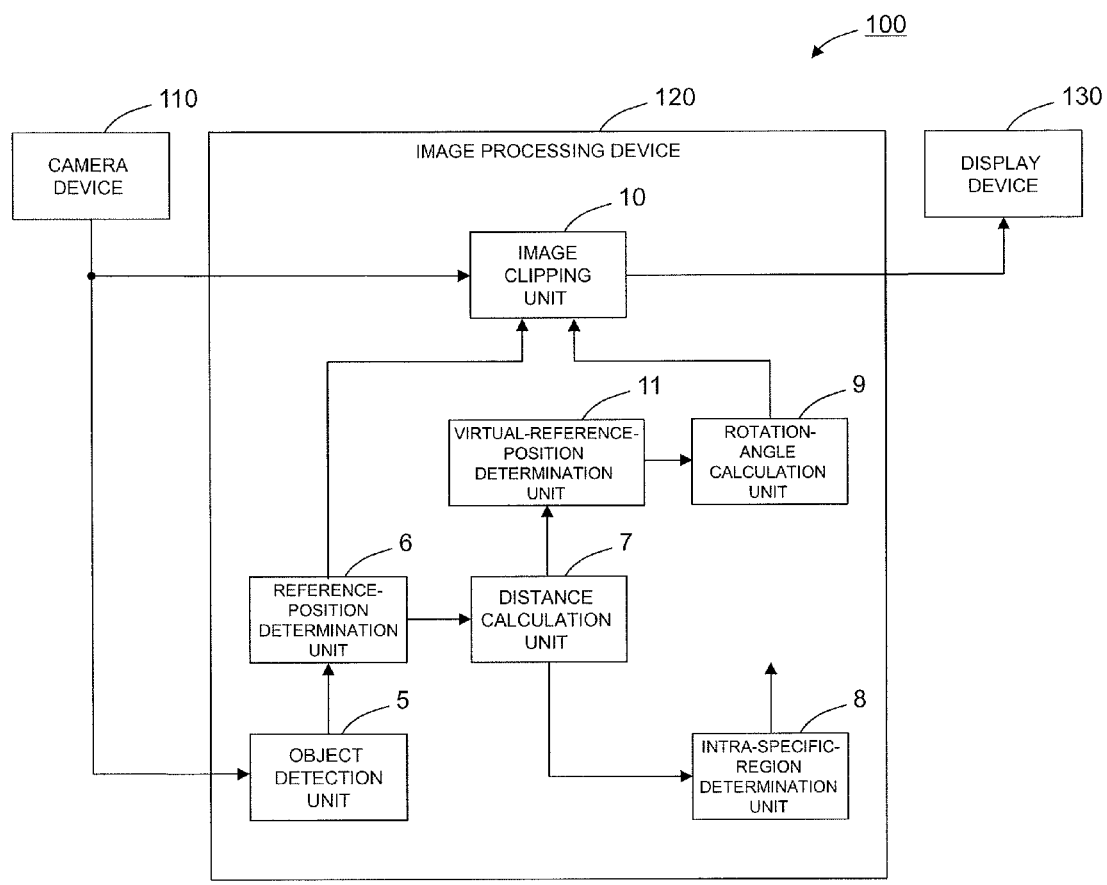
FIG. 9 is a block diagram of an image processing system in accordance with another embodiment of the present invention.

For example, in the above description, although the examples of the camera devices shown in FIG. 1 and FIG. 6 are described, the present invention is not limited to these examples. The same effect as in the above embodiments can also be achieved by an image processing system 100 constituted from a camera device 110, an image processing device 120, and a display device 130 as shown in FIG. 8 and FIG. 9. In such the image processing system 100, the camera device 110 may have the function of the imaging unit 2, the image processing device 120 may have the function of the display-image generation unit 3, and the display device 130 may have the function of the display unit 4.

While there has been described what is at present considered to be a preferred embodiments of the invention, it will be understood that various modifications and variations may be made thereto, and it is intended that appended claims cover all such modifications and variations as fall within the true spirit and scope of the invention.

INDUSTRIAL APPLICABILITY

As described above, the camera device in accordance with the present invention has the effect of being able to prevent a sudden change in orientation of an imaging object displayed in a display image occurring when the imaging object passes nearly just under the camera device. Thus, the camera device is applicable to, for example, a system for monitoring a predetermined imaging area (such as a store and a station yard) and is useful.

REFERENCE SIGNS LIST 1 camera device
2 imaging unit
3 display-image generation unit
4 display unit
5 object detection unit
6 reference-position determination unit
7 distance calculation unit
8 intra-specific-region determination unit
9 rotation-angle calculation unit
10 image clipping unit
11 virtual-reference-position determination unit
100 image processing system
110 camera device
120 image processing device
130 display device

The invention claimed is:

1. A camera device comprising:
an imaging unit that generates an imaging area image in which the imaging area is captured from above; and
a display-image generation unit that generates a display image of an imaging object moving in the imaging area by use of an clipped image clipped from the imaging area image,
wherein the display-image generation unit includes:
a reference-position determination unit determining as an clipping reference position, a position in the imaging area image, corresponding to the imaging object and serving as a reference when the clipped image is clipped from the imaging area image;
a distance calculation unit calculating as a reference distance, a distance between an imaging reference position which is a position corresponding to the imaging unit, and the clipping reference position in the imaging area image;
a rotation-angle calculation unit calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and
an image clipping unit generating the display image by clipping an image as the clipped image on the basis of the clipping reference position and the rotation angle.

2. The camera device according to claim 1, wherein the rotation-angle calculation unit calculates the rotation angle by performing weighting processing according to the reference distance with respect to a target angel for rotating the clipped image when the clipping reference position becomes closest to the imaging reference position and the reference angle, and
the weighting processing is processing in which the shorter the reference distance is, the smaller the weighting of the reference angle is and the larger the weighting of the target angle is.

3. The camera device according to claim 2, wherein the weighing processing is processing that sets the rotation angle to the target angle when the reference distance is shorter than or equal to a second threshold distance shorter than the threshold distance.

4. The camera device according to claim 2, wherein the target angle is set to the reference angle defined when the imaging object enters the imaging area or to be 0 degree.

5. The camera device according to claim 1 comprising an object detection unit that detects the imaging object included in the imaging area image by performing image processing to the imaging area image.

6. The camera device according to claim 1, wherein the display-image generation unit includes a virtual-reference-position determination unit determining, based on the clipping reference position, a virtual clipping reference position having a distance from the imaging reference position of not shorter than the threshold distance when the reference distance is shorter than or equal to the threshold distance,
the rotation-angle calculation unit calculates the rotation angle on the basis of the reference angle and the reference distance defined when the clipping reference position is the virtual clipping reference position when the reference distance is shorter than or equal to the threshold distance, and
the image clipping unit generates the display image by clipping an image as the clipped image on the basis of the clipping reference position and the rotation angle defined when the clipping reference position is the virtual clipping reference position.

7. The camera device according to claim 1, wherein the imaging unit has a lens with a wider angle of view than a normal lens.

8. An image processing system comprising:
a camera device that generates an imaging area image in which the imaging area is captured from above; and
an image processing device that generates a display image of an imaging object moving in the imaging area by use of an clipped image clipped from the imaging area image,
wherein the image processing device includes:
a reference-position determination unit determining as an clipping reference position, a position in the imaging area image, corresponding to the imaging object and serving as a reference when the clipped image is clipped from the imaging area image;
a distance calculation unit calculating as a reference distance, a distance between an imaging reference position which is a position corresponding to the camera device, and the clipping reference position in the imaging area image;
a rotation-angle calculation unit calculating a rotation angle for rotating the clipped image in generating the display image on the basis of a reference angle which is a angle corresponding to an inclination of the imaging object in the imaging area image, and the reference distance when the reference distance is shorter than or equal to a predetermined threshold distance; and an image clipping unit generating the display image by clipping an image as the clipped image on the basis of the clipping reference position and the rotation angle.

9. An image processing method generating a display image of an imaging object moving in the imaging area by use of an clipped image clipped from the imaging area image in which an imaging area is captured from above, the image processing method comprising: determining as an clipping reference position, a position in the imaging area image, corresponding to the imaging object and serving as a reference when the clipped image is clipped from the imaging area image; subsequently calculating as a reference distance, a distance between an imaging reference position which is a position corresponding to the camera device, and the clipping reference position in the imaging area image; subsequently calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and finally generating the display image by clipping an image as the clipped image on the basis of the clipping reference position and the rotation angle.

10. A non-transitory computer readable medium storing an image processing program generating a display image of an imaging object moving in the imaging area by use of an clipped image clipped from the imaging area image in which an imaging area is captured from above, the image processing program causing a computer to execute the processing of: determining as an clipping reference position, a position in the imaging area image, corresponding to the imaging object and serving as a reference when the clipped image is clipped from the imaging area image; calculating as a reference distance, a distance between an imaging reference position which is a position corresponding to the camera device, and the clipping reference position in the imaging area image; calculating a rotation angle for rotating the clipped image in generating the display image on the basis of a reference angle which is an angle corresponding to an inclination of the imaging object in the imaging area image, and the reference distance when the reference distance is shorter than or equal to a predetermined threshold distance; and generating the display image by clipping an image as the clipped image on the basis of the clipping reference position and the rotation angle.

* * * * *